US012790031B2

United States Patent

(12) United States Patent
Parrish Ré et al.

(10) Patent No.: US 12,790,031 B2
(45) Date of Patent: Nov. 10, 2026

(54) NEURAL NETWORK SAFETY CHECK

(71) Applicant: Advanced Space, LLC, Westminster, CO (US)

(72) Inventors: Nathan Parrish Ré, Billings, MT (US); Timothy M. Sullivan, Colorado Springs, CO (US); Matthew D. Popplewell, Westminster, CO (US); Tyler M. Hanf, Broomfield, CO (US)

(73) Assignee: Advanced Space, LLC, Westminster, CO (US)

( * ) Notice: Subject to any disclaimer, the term of this patent is extended or adjusted under 35 U.S.C. 154(b) by 58 days.

(21) Appl. No.: 18/664,743

(22) Filed: May 15, 2024

(65) Prior Publication Data

US 2024/0383621 A1 Nov. 21, 2024

Related U.S. Application Data

(60) Provisional application No. 63/594,182, filed on Oct. 30, 2023, provisional application No. 63/592,787, (Continued)

(51) Int. Cl.

*B64G 1/24* (2006.01)
*G01C 21/24* (2006.01)
*G06N 3/045* (2023.01)

(52) U.S. Cl.

CPC ............. *B64G 1/247* (2023.08); *G01C 21/24* (2013.01); *G06N 3/045* (2023.01)

(58) Field of Classification Search

CPC ........ B64G 1/247; B64G 1/411; G01C 21/24; G06N 3/045; G06N 3/08; G06N 20/00; (Continued)

(56) References Cited

U.S. PATENT DOCUMENTS 8,428,916 B2 4/2013 Koller et al.
8,880,246 B1 11/2014 Karpenko et al.
(Continued)

FOREIGN PATENT DOCUMENTS

CN 105160417 A 12/2015
CN 111498148 A 8/2020
(Continued)

OTHER PUBLICATIONS

Lafarge, et al., A Hybrid Closed-Loop Guidance Strategy For Low-Thrust Spacecraft Enabled By Neural Networks, 31st AAS/AIAA Space Flight Mechanics Meeting, Feb. 2021, 20 pages, Charlotte, NC. (Year: 2021).*
(Continued)

*Primary Examiner* — Hitesh Patel
*Assistant Examiner* — Ashleigh Nicole Turnbaugh
(74) *Attorney, Agent, or Firm* — Avek IP, LLC

(57) ABSTRACT

A safety check method for checking a neural network output state onboard a spacecraft includes executing a neural network model onboard a spacecraft, which includes calculating a neural network output based on a current navigation state of the spacecraft, propagating the navigation state with the neural network output to a next target epoch to determine a next navigation state of the spacecraft, and evaluating whether the neural network output and the next navigation state are within predetermined bounds. When the neural network output and the next navigation state are within the predetermined bounds, the method is incremented to a next tick. When the neural network output and the next navigation state are determined to be outside the predetermined bounds, a corrective action may be taken.

19 Claims, 5 Drawing Sheets

Related U.S. Application Data filed on Oct. 24, 2023, provisional application No. 63/502,309, filed on May 15, 2023.

(58) Field of Classification Search
CPC ............ G06N 3/063; G08G 5/55; G08G 5/22; G08G 5/26; G08G 5/727; G08G 5/53; G06F 11/0736; G06F 11/0739; G06F 11/0754
USPC ............................................................ 701/13
See application file for complete search history.

(56) References Cited

U.S. PATENT DOCUMENTS

| | | | | |
|---|---|---|---|---|
| 10,049,505 | B1 * | 8/2018 | Harvey | B60R 16/0234 |
| 10,696,298 | B2 * | 6/2020 | Movert | B60W 50/0097 |
| 10,796,204 | B2 | 10/2020 | Rohani et al. | |
| 2002/0083027 | A1 | 6/2002 | Biggers et al. | |
| 2018/0120843 | A1 | 5/2018 | Berntorp et al. | |
| 2018/0348250 | A1 | 12/2018 | Higgins et al. | |
| 2019/0101917 | A1 | 4/2019 | Yao et al. | |
| 2019/0309979 | A1 | 10/2019 | Hurley et al. | |
| 2020/0017114 | A1 * | 1/2020 | Santoni | G06F 11/1641 |
| 2020/0062426 | A1 * | 2/2020 | Drexler | B64G 1/408 |
| 2021/0292011 | A1 | 9/2021 | Limotta | |
| 2021/0364645 | A1 | 11/2021 | Kim et al. | |
| 2022/0227503 | A1 | 7/2022 | Barnhart et al. | |
| 2022/0237402 | A1 | 7/2022 | Unnikrishnan et al. | |
| 2023/0205533 | A1 | 6/2023 | Agam | |
| 2023/0286673 | A1 * | 9/2023 | Smith | G05B 13/042 |

FOREIGN PATENT DOCUMENTS

| | | | |
|---|---|---|---|
| CN | 112114521 | A | 12/2020 |
| CN | 112580407 | A | 3/2021 |
| CN | 112580819 | A | 3/2021 |
| CN | 113268859 | A | 8/2021 |
| CN | 113850838 | A | 12/2021 |
| CN | 114111773 | A | 3/2022 |
| CN | 114154231 | A | 3/2022 |
| CN | 114383617 | A | 4/2022 |
| CN | 116448104 | A | 7/2023 |
| KR | 102314038 | B1 | 6/2021 |
| RU | 2304549 | C2 | 8/2007 |
| WO | 2019023628 | A1 | 1/2019 |
| WO | 2020247721 | A1 | 12/2020 |

OTHER PUBLICATIONS

Dachwald, Low-Thrust Trajectory Optimization and Interplanetary Mission Analysis Using Evolutionary Neurocontrol, Dissertation, University of the Bundeswehr Munich, Faculty of Aerospace Engineering, Institute of Space Technology, 153 pages.

International Search Report and Written Opinion dated Feb. 11, 2025, 13 pages, issued in International Application No. PCT/US2024/052575.

International Search Report and Written Opinion dated Feb. 26, 2025, 14 pages, issued in International Application No. PCT/US2024/053640.

Naoya, et al., Asteroid Flyby Cycler Trajectory Design Using Deep Neural Networks, Journal of Guidance Control and Dynamics, vol. 45, No. 8, Aug. 2022, pp. 1496-1511.

Parrish, et al., Neural Networks for Onboard Maneuver Design, 73rd International Astronautical Congress (IAC), Sep. 22, 2022, 12 pages, IAC-22-C1,3,3,x73038, Paris, France.

Rubinsztejn, et al., Neural Network Based Optimal Control: Resilience to Missed Thrust Events for Long Duration Transfers, AAS/AIAA Astrodynamics Specialist Conference, Portland, ME, Univelt, Inc., Aug. 11, 2019, 14 pages.

International Search Report and Written Opinion dated Sep. 16, 2024, 13 pages, issued in International Application No. PCT/US2024/029341.

Casey, A Methodology For Sequential Low Thrust Trajectory Optimization Using Prediction Models Derived From Machine Learning Techniques, Thesis, School of Aerospace Engineering, Georgia Institute of Technology, May 2019, 94 pages.

Garcia, et al., Electric Propulsion Intelligent Control (EPIC) Toolbox for Proximity Operations and Safety Analysis in Low-Earth Orbit (LEO), 2021 Advanced Maui Optical and Space Surveillance Technologies Conference, Sep. 2022, 16 pages, Wailea Beach Resort Marriott Maui, Hawaii.

Lafarge, et al., A Hybrid Closed-Loop Guidance Strategy For Low-Thrust Spacecraft Enabled By Neural Networks, 31st AAS/AIAA Space Flight Mechanics Meeting, Feb. 2021, 20 pages, Charlotte, NC.

Li, et al., Neural networks in time-optimal low-thrust interplanetary transfers, IEEE Access, Oct. 12, 2019, vol. 7, pp. 156413-156419.

Matveev, et al., Diagnostic and Monitoring System for Technical Condition of Electromechanical Section of Thermal Control Systems in Spacecraft, International Journal of Mathematical, Engineering and Management Sciences, 2020, vol. 5, No. 1, pp. 181-192.

Mereta, et al., Machine learning of optimal low-thrust transfers between near-earth objects, Lecture Notes in Computer Science (LNAI, vol. 10334), Springer International Publishing AG 2017, Jun. 2, 2017, The Netherlands, pp. 543-553.

Miller, Low-Thrust Spacecraft Guidance and Control Using Proximal Policy Optimization, Department of Aeronautics and Astronautics, Massachusetts Institute of Technology, Jun. 2020, 107 pages.

Mughal, et al., Design of Deep Neural Networks for Transfer Time Prediction of Spacecraft Electric Orbit-Raising, Intelligent Systems with Applications, 2022, 16 pages.

Parrish, Low Thrust Trajectory Optimization in Cislunar and Translunar Space, Thesis, University of Colorado, 2018, 159 pages.

Rubinsztejn, et al., Neural network optimal control in astrodynamics: Application to the missed thrust problem, Acta Astronautica 176, 2020, pp. 192-203.

Schmitt, et al., Swing-By Applications and Estimation of the Van Allen Belts' Radiation Exposure for a Spacecraft in a Low Thrust Transfer to the Moon, Symmetry, Mar. 19, 2022, 14, 617, 38 pages.

Xie, et al., Feasible Low-Thrust Trajectory Identification via a Deep Neural Network Classifier, Australian Centre for Space Engineering Research (ACSER), University of New South Wales (UNSW), ArXiv, Feb. 10, 2012, 18 pages.

Zavoli, et al., Reinforcement learning for low-thrust trajectory design of interplanetary missions, Computer Science, ArXiv, Aug. 19, 2020, 20 pages.

Zhu, et al., Fast Evaluation of Low-Thrust Transfers via Deep Neural Networks, National University of Defense Technology, ArXiv, Dec. 20, 2018, 33 pages.

Gu, D., & Zhu, H. (2016). Optimal orbit transfer of spacecraft under constant thrust. 2016 Chinese Control and Decision Conference (CCDC), 729a733. doi:10.1109/CCDC.2016.7531081 (Year: 2016).

* cited by examiner

NEURAL NETWORK SAFETY CHECK

CROSS-REFERENCE TO RELATED APPLICATIONS

This application claims the benefit of priority of U.S. Provisional Patent Application No. 63/592,787, entitled Incremental Neural Network Model Inference, and filed on Oct. 24, 2023; U.S. Provisional Patent Application No. 63/594,182, entitled Almanac of Neural Network Models, and filed on Oct. 30, 2023; and U.S. Provisional Patent Application No. 63/502,309, entitled Neural Network Safety Check, and filed on May 15, 2023, the disclosures of which are herein incorporated by reference in their entirety.

BACKGROUND

1. Field

Embodiments of the invention relate generally to the field of space navigation systems, and more specifically to systems employing neural networks for optimizing navigation controls in space.

2. Related Art

Space navigation systems are an integral part of both manned and unmanned space flights since the inauguration of space missions in the 1960s. Space navigation requires complicated calculations, taking into account not only the speed, the location, and the inertia of the spacecraft, but also the gravity field and many interspace perturbations from nearby planets and objects.

Multiple methods have been provided for spacecraft navigation using neural networks. For example, United States Patent Application Publication No. 2022/0227503 to Barnhart et al. discloses a system using genetic algorithms for safe swarm trajectory optimization. United States Patent Application Publication No. 2002/0083027 to Biggers et al. discloses a neural network trajectory command controller for controlling trajectory of an object. U.S. Pat. No. 8,880,246 to Karpenko et al. discloses method and apparatus for determining spacecraft maneuvers using a control law or steering law as a path constraint or as a dynamic constraint. Foreign reference CN112114521 to Xu et al. discloses an intelligent prediction control entry guidance method for a spacecraft. Foreign reference CN111498148 to Deng et al. discloses an FDNN-based intelligent spacecraft control method. Foreign reference RU2304549C2 discloses a self-contained onboard control system of “gasad-2a” spacecraft. Foreign reference CN112580819 discloses to Huyan et al. a low-orbit satellite precise orbit determination strategy supported by machine learning. Foreign reference CN114111773 to Liu et al. discloses a combined navigation method, a device, a system and a storage medium. Foreign reference KR102314038 discloses a method of determining a singular area, a method of generating an onboard map, and a method of determining a direction of a lander. Non-patent literature to Garcia et al. discloses an electric propulsion intelligent control (EPIC) toolbox for proximity operations and safety analysis in low-earth orbit (LEO). Non-patent literature to LaFarge et al. discloses a hybrid closed-loop guidance strategy for low-thrust spacecraft enabled by neural networks. Non-patent literature to Mughal et al. discloses a design of deep neural networks for transfer time prediction of spacecraft electric orbit-raising. Non-patent literature to Rubinstein et al. discloses a neural network optimal control in astrodynamics for application to the missed thrust problem.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In certain aspects, a safety check method for checking a neural network output state onboard a spacecraft includes: providing a neural network model to a disk storage of a spacecraft computer, wherein the spacecraft computer is configured to execute the neural network model onboard the spacecraft; calculating, via the neural network model, a neural network output based on a current navigation state of the spacecraft; propagating the navigation state with the neural network output to a next target epoch to determine a next navigation state of the spacecraft; and evaluating whether the neural network output and the next navigation state are within predetermined bounds.

In certain aspects, a safety check method for checking an output state onboard a spacecraft includes: providing a navigation app, a maneuver design app, and a safety check app to a disk storage of a spacecraft computer, wherein the spacecraft computer is configured to execute the navigation app, the maneuver design app, and the safety check app onboard the spacecraft; receiving navigation state inputs via the navigation app and outputting an updated navigation state estimate based upon the navigation state inputs; receiving, via the maneuver design app, the updated navigation state estimate and outputting a maneuver design; performing a safety check via the safety check app, wherein the safety check app receives the maneuver design and determines whether the maneuver design is within predetermined bounds; when the maneuver design is within the predetermined bounds, executing a spacecraft maneuver; and when the maneuver design is determined to be outside the predetermined bounds, taking a corrective action.

In certain aspects, a control architecture configured for performing a safety check on a maneuver design for navigation of a spacecraft includes: an autonomous control executive, a navigation app, a maneuver design app, and a safety check app stored in a disk storage of a spacecraft computer, wherein the spacecraft computer is configured to execute the autonomous control executive, the navigation app, the maneuver design app, and the safety check app onboard the spacecraft; wherein the autonomous control executive provides dedicated operation scheduling for the navigation app, the maneuver design app, and the safety check app; wherein the navigation app is configured to determine a navigation update based on a navigation state estimate of the spacecraft; wherein the maneuver design app is configured to determine a maneuver design based on the navigation update; and wherein the safety check app is configured to perform a safety check that determines whether the maneuver design is within predetermined bounds.

BRIEF DESCRIPTION OF THE DRAWING FIGURES

Embodiments of the invention are described in detail below with reference to the attached drawing figures, wherein.

Figure 3:
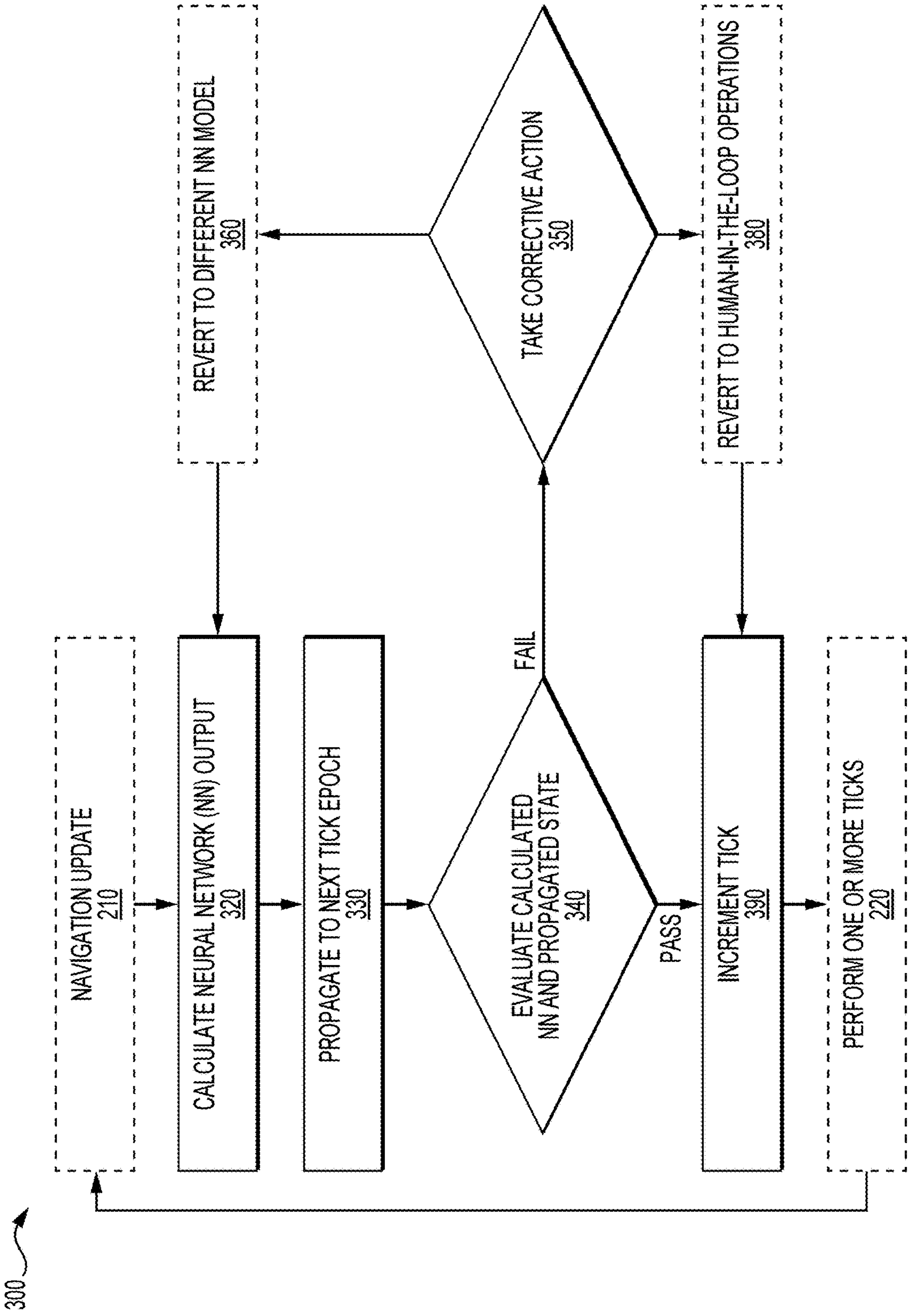
Figure 4:
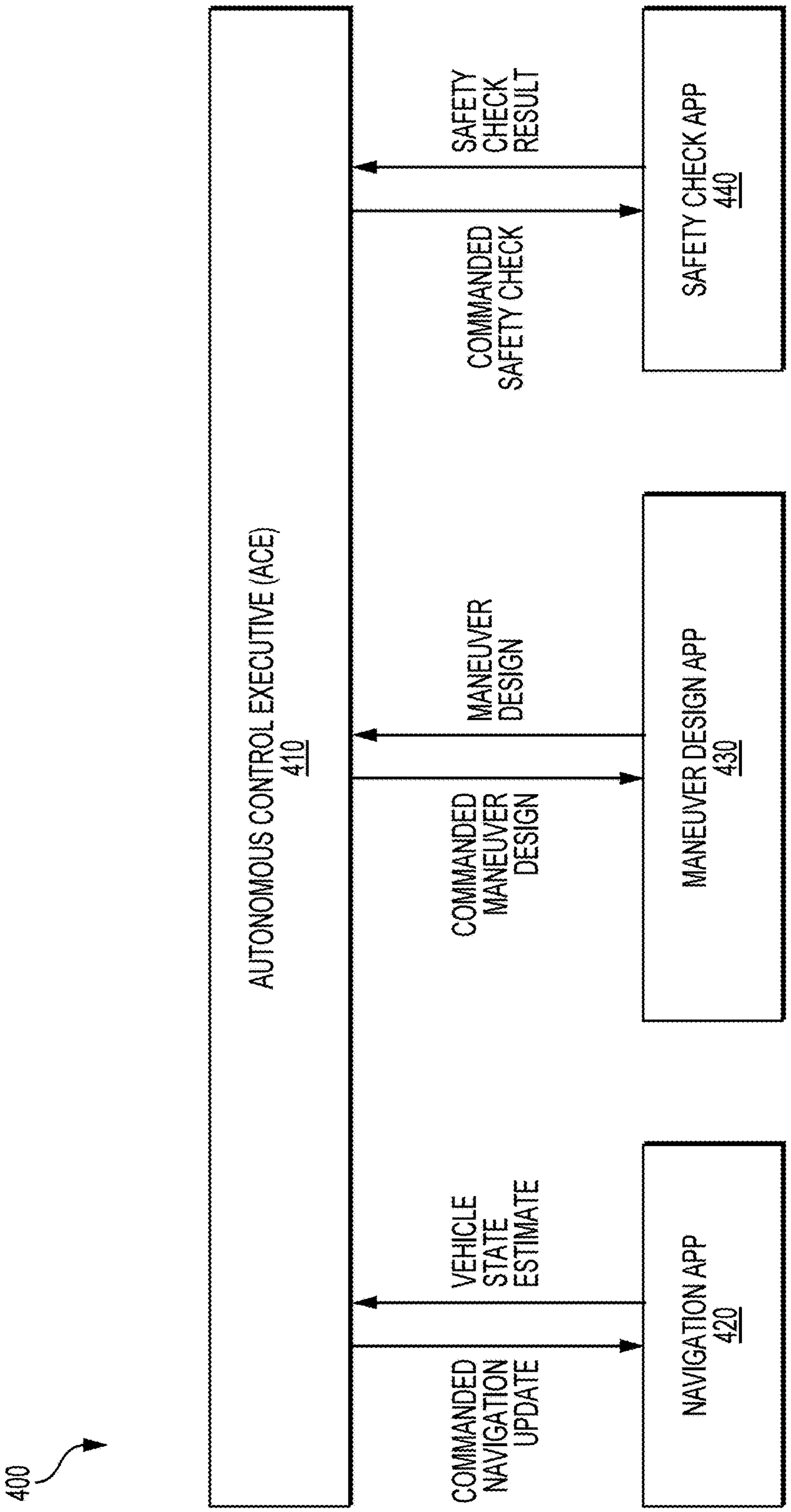
Figure 5:
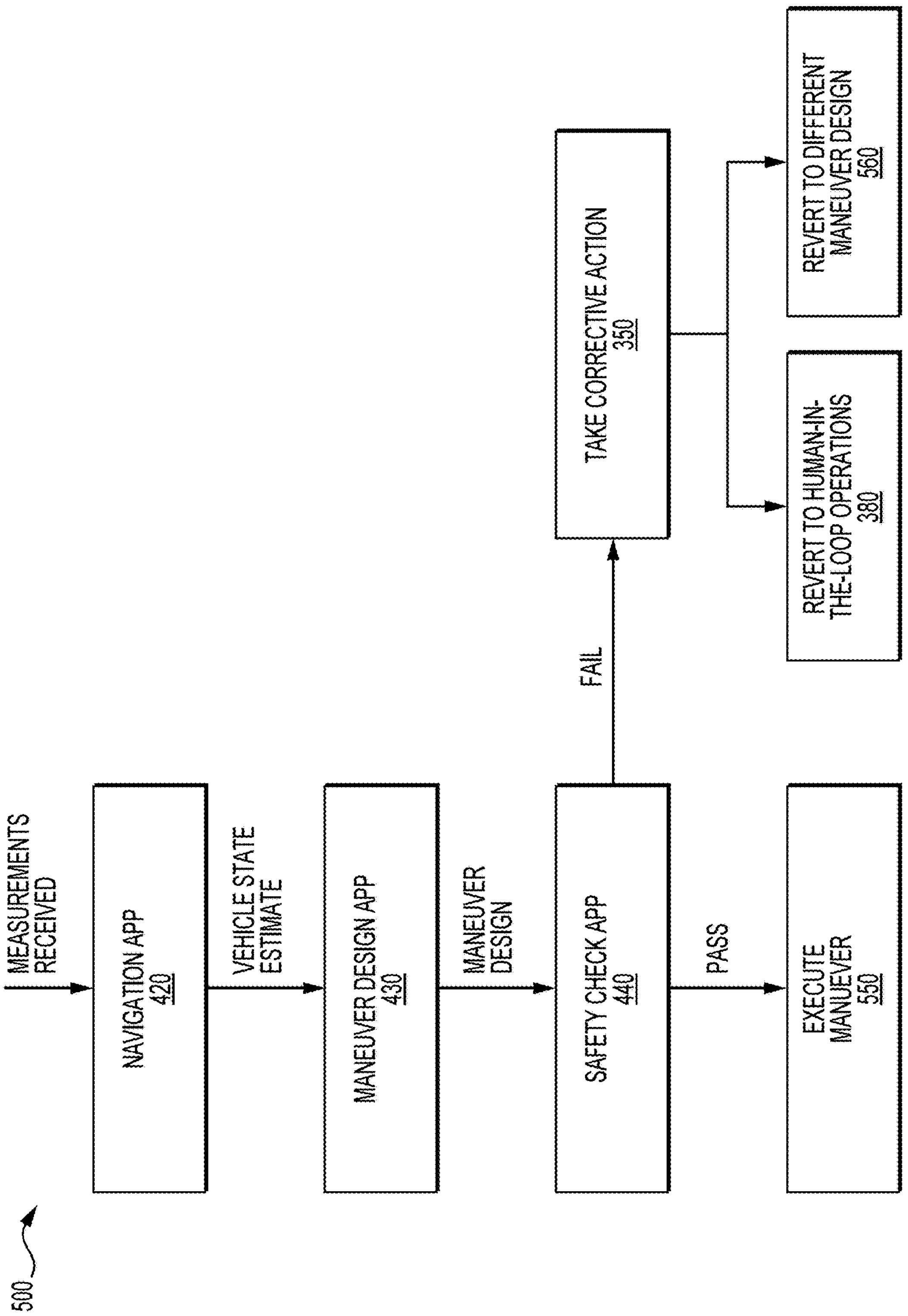

FIG. 3. is a flow diagram showing steps of a safety check method for autonomous neural network control for spacecraft navigation, in an embodiment;

FIG. 4 shows a software architecture for performing a navigation update, a maneuver design, and a safety check onboard a spacecraft, in an embodiment; and FIG. 5 shows an exemplary method for spacecraft navigation having a safety check, in an embodiment.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Space navigation requires accurately determining a spacecraft's trajectory periodically. Early trajectory determination techniques relied on optical tracking with telescopes. A single observation consists of two angular measurements (right ascension and declination). Therefore, a minimum of three measurements at three different epochs is required to provide six independent quantities required for a trajectory determination. Examples of optical tracking techniques include the method of Laplace, the method of Gauss, and the double r-iteration method.

Modern trajectory determination technologies depend on ground stations to pinpoint the position and movement of spacecraft. The ground stations use mechanisms such as radar, signal doppler, and laser reflectors to acquire orbital mechanics to calculate where the spacecraft is at a specific point in time. The orbital mechanics information is then compiled into an ephemeris table to calculate a precise position of the spacecraft. Other known remote sensing techniques can assist in space navigation by providing information in combination with the Global Navigation Satellite System (GNSS).

Spacecrafts are generally equipped with propulsion systems capable of providing small amounts of thrust for making orbital maneuvers. High thrust systems may operate for short bursts (seconds to minutes), while low thrust systems may operate over longer timeframes (days to weeks). For low thrust systems, small amounts of thrust may be applied over a significant fraction of a mission trajectory, which causes the optimal control problem (OCP) of shifting the spacecraft trajectory to be continuous rather than discrete, typically making the design of trajectories computationally more demanding.

Figure 1A:
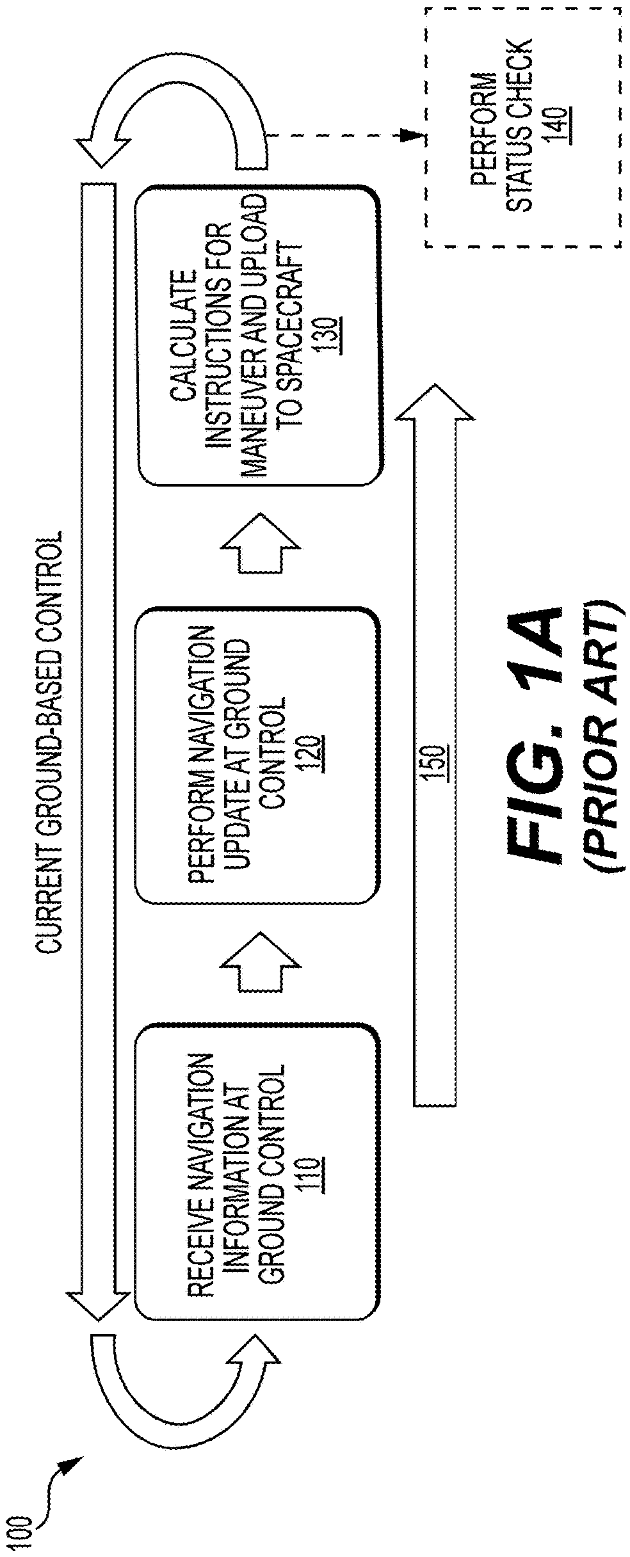
FIG. 1A (PRIOR ART)
FIG. 1A is a schematic diagram showing a ground-based control architecture for spacecraft navigation.

As illustrated in a schematic diagram of FIG. 1A, space missions are currently operated via a ground-based mission control center (MCC) using a ground-based control method 100. The MCC manages spaceflight operations from launch until landing or the end of the mission. A staff of flight controllers and other support personnel monitor all aspects of the mission using telemetry and sending commands to the spacecraft using ground stations. Personnel supporting the mission from an MCC can include representatives of the attitude control system, power, propulsion, thermal, attitude dynamics, orbital operations and other subsystem disciplines.

In a step 110, navigation information for the spacecraft is received at the MCC. In an example of step 110, the MCC receives navigation information about the spacecraft and determines a state (e.g., a position vector and a velocity vector) of the spacecraft.

In a step 120, a navigation update is performed at the MCC. In an example of step 120, the MCC predicts a next state of the spacecraft. For example, a position vector and velocity vector of the spacecraft is predicted for the next contact time with the spacecraft.

In a step 130, instructions for a maneuver are calculated and uploaded to the spacecraft. In an example of step 130, the MCC uploads commands from the ground control station to the spacecraft. The instructions may be for the spacecraft to coast or for the thrusters to execute a maneuver, for example.

In an optional step 140, a status check is performed. In an example of step 140, the ground team may perform periodic status checks on the spacecraft state.

Method 100 occurs over a timeframe 150. Timeframe 150 may be on the order of days to weeks due to the time lag for communicating with a distant spacecraft from the ground control station. The uncertainty of the spacecraft state increases with increasing timeframes.

Method 100 is then repeated by returning to step 110.

Long-distance communication between the ground-based MCCs and spacecraft far from Earth requires large and sensitive scientific telecommunications systems. For example, NASA's Deep Space Network (DSN) consists of three facilities spaced equidistant from each other—approximately 120 degrees apart in longitude—around the world. These sites are at Goldstone, near Barstow, California; near Madrid, Spain; and near Canberra, Australia. The strategic placement of these sites permits constant communication with spacecraft as our planet rotates-before a distant spacecraft sinks below the horizon at one DSN site, another site picks up the signal.

Each of the three DSN sites has multiple large antennas and is designed to enable continuous radio communication between several spacecraft and Earth. All three complexes consist of at least four antenna stations, each equipped with large parabolic dish antennas and ultra-sensitive receiving systems capable of detecting incredibly faint radio signals from distant spacecraft. For example, one of the massive antennas, located at NASA's Goldstone Deep Space Communications Complex in Barstow, California, is the 70-meter (330-foot) DSS-14 antenna. Each complex is situated in semi-mountainous, bowl-shaped terrains to shield against external radio frequency interference. For maintaining an effective long-distance communication, the DSN's large antennas have focusing mechanisms that concentrate power when receiving data and when transmitting commands. The antennas must point very accurately towards the spacecraft in a tiny portion of the sky. To hear the spacecraft's faint signal, the antennas must be equipped with amplifiers. However, there are two challenges. First, the signal becomes degraded by background radio noise, or static, emitted naturally by nearly all objects in the universe, including the sun and earth. The background noise gets amplified along with the signal. Second, the powerful electronic equipment amplifying the signal adds noise of its own. The DSN uses highly sophisticated technology, including cooling the amplifiers to a few degrees above absolute zero, and special techniques to encode signals so the receiving system can distinguish the signal from the unwanted noise. Antenna stations are remotely operated from a signal processing center at each complex. The centers house electronic systems that point and control the antennas, receive and process data, transmit commands and generate spacecraft navigation data.

The antennas of the Deep Space Network are the indispensable link to explorers venturing beyond Earth. Space mission operations teams use the DSN Command System to control the activities of their spacecraft. Commands are sent to robotic probes as coded computer files that the craft execute as a series of actions. The DSN Tracking System provides two-way communication between Earth-based equipment and a spacecraft, making measurements that allow flight controllers to determine the position and velocity of spacecraft with great precision. They provide the crucial connection for commanding our spacecraft and receiving their never-before-seen images and scientific information on Earth, propelling our understanding of the universe, our solar system and ultimately, our place within it. In addition to its vital role as the communications hub for deep space exploration, the DSN is also used as an advanced instrument for scientific research, including radio astronomy and radar mapping of passing asteroids.

As missions voyage further from Earth, it is important to continuously communicate with these spacecrafts and navigate them through space when they are so far from these ground-based control stations. In recent years, advanced spacecrafts have been designed and built to reach further away locations such as the Sun, Mercury, Mars, Jupiter and the Didymos asteroids—a trend that will continue into the years ahead. As such, a new challenge appears in view of this trend.

Figure 1B:
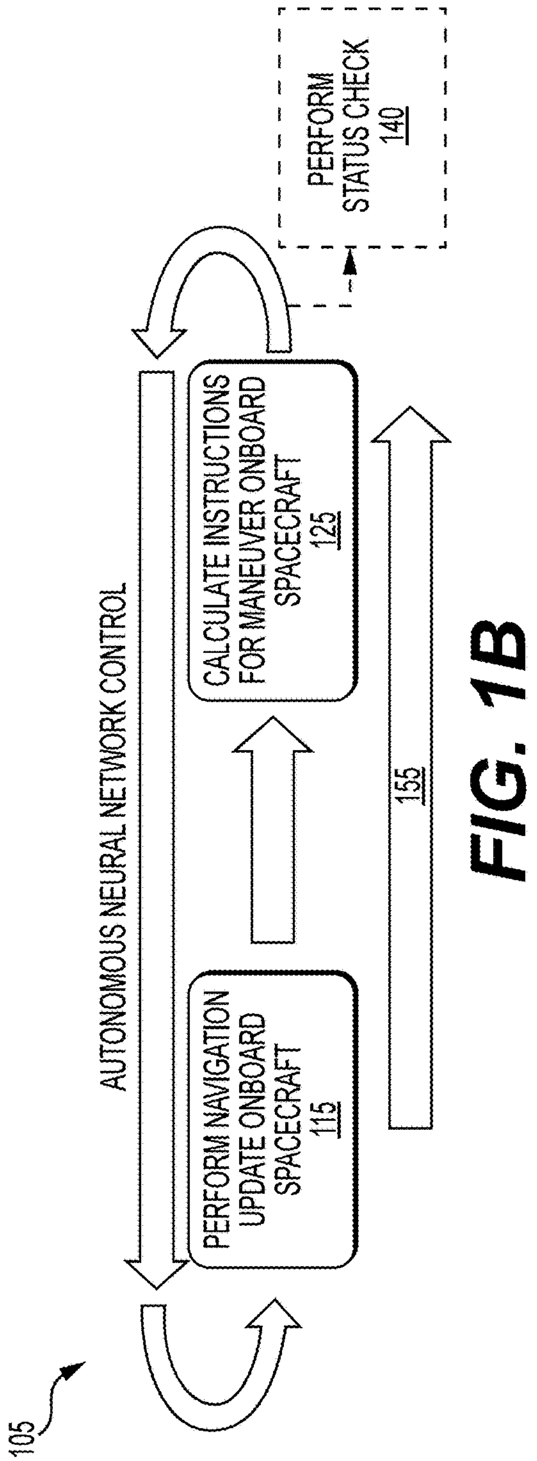
FIG. 1B is a schematic diagram showing an autonomous neural network control architecture for spacecraft navigation that takes place onboard a spacecraft.

FIG. 1B illustrates an exemplary autonomous neural network control method 105 for autonomously controlling navigation of a spacecraft. In contrast to using ground-based control, which operates with outdated navigation data, the onboard autonomous control uses the latest navigation data in real-time or near real-time. Compared with ground-based control, onboard autonomous control may provide an immediate course correction. A neural network (NN) model approximates solutions to the optimal control problem with minimal computational overhead, operating as a feedback controller. The NN model is trained with a set of training data. For example, a "training tube" may be established around a nominal path for low-thrust trajectory corrections. In embodiments, the training tube refers to position and velocity errors around the nominal path. The NN model is then trained to respond to the position and velocity errors within the training tube and return the position and velocity values back to the nominal path values within a predetermined time frame $\Delta t$. In some embodiments, checkpoints are employed prior to especially sensitive parts of a trajectory (e.g., a flyby or other critical maneuver) to help ensure that the NN model can maintain the spacecraft path within the training tube. In certain embodiments, several NN models are trained, with each NN model being responsible for a section of a nominal transfer, which may produce better results compared to training one NN model over the entire transfer. Outputs of the one or more NN models may be compared to traditional methods (e.g., Monte Carlo simulations) to evaluate performance of the one or more NN models.

In a step 115, an onboard navigation update is performed. In an example of step 115, a computer onboard the spacecraft determines a state of the spacecraft (e.g., position, direction, and velocity of the spacecraft) and calculates navigation updates of the spacecraft state to predict a next state of the spacecraft (e.g., at a target epoch). In embodiments, the spacecraft may receive information for determining the state of the spacecraft from the Global Positioning System (GPS), the optical navigation system, or the Cislunar Autonomous Positioning System (CAPS), for example. In some embodiments, the onboard computer determines the spacecraft state based on an earlier navigation update. Alternatively, the spacecraft state may also be determined based on information from instruments onboard the spacecraft.

In a step 125, instructions for a maneuver are calculated onboard the spacecraft. In an example of step 125, a navigation state estimate is input to a NN model via an onboard computer, and maneuver instructions are output from the NN model.

In optional step 140, a status check is performed. In an example of step 140, the spacecraft onboard computer performs periodic status checks. The status check outcomes may be transmitted to a ground control station for monitoring.

Method 105 occurs over a timeframe 155. Timeframe 155 is on the order of minutes (e.g., ten minutes) due to the neural network calculations being performed locally on the spacecraft flight computer. Therefore, the spacecraft state remains accurate due to the short timeframe. The short timeframe also enables the spacecraft to make immediate course corrections whenever necessary. For a long duration maneuver (days to weeks), instructions for the next maneuver may be updated repeatedly on a shorter timeframe (e.g., every 5 to 10 minutes) while the maneuver is happening by using the NN model onboard the spacecraft.

Following step 125, method 105 is repeated by returning to step 115. Method 105 may be repeated at a more frequent rate compared with method 100 due to timeframe 155 being much shorter compared to timeframe 150.

Neural networks (NN), also known as artificial neural networks (ANNs) or simulated neural networks (SNNs), are a subset of machine learning algorithms. Their name and structure are inspired by the human brain, mimicking the way that biological neurons signal to one another. Artificial neural networks (ANNs) are comprised of a node of layers, containing an input layer, one or more hidden layers, and an output layer. Each node, or artificial neuron, connects to another and has an associated weight and threshold. If the output of any individual node is above the specified threshold value, that node is activated, sending data to the next layer of the network. Otherwise, no data is passed along to the next layer of the network.

Neural network (NN) control provides a means for onboard maneuver correction without over-simplifying the calculations by learning the relationship between a spacecraft's state and an optimal maneuver to maintain an operational slot. The spacecraft's guidance and navigation system may evaluate the NN control in-flight, resulting in a reduction in operational costs and improvement in maneuver accuracy.

A neural network control for electric propulsion (NNEP) algorithm may be used with the following non-limiting examples: (1) application of NNEP algorithm to maneuver corrections for minimum-fuel transfers; (2): application of NNEP algorithm to GEO station keeping; (3) application of NNEP algorithm to Earth-Moon Halo Orbit station keeping; (4) application of NNEP algorithm to trajectory correction maneuvers for a chemical propulsion interplanetary mission; (5) application of NNEP algorithm to many-revolution spiral transfers; and (6) LEO station keeping. In embodiments, neural networks may also be used for missions with chemical propulsion, for large or small maneuvers, and for a range of dynamical environments including Earth orbit, the cislunar environment, and interplanetary space.

Figure 2:
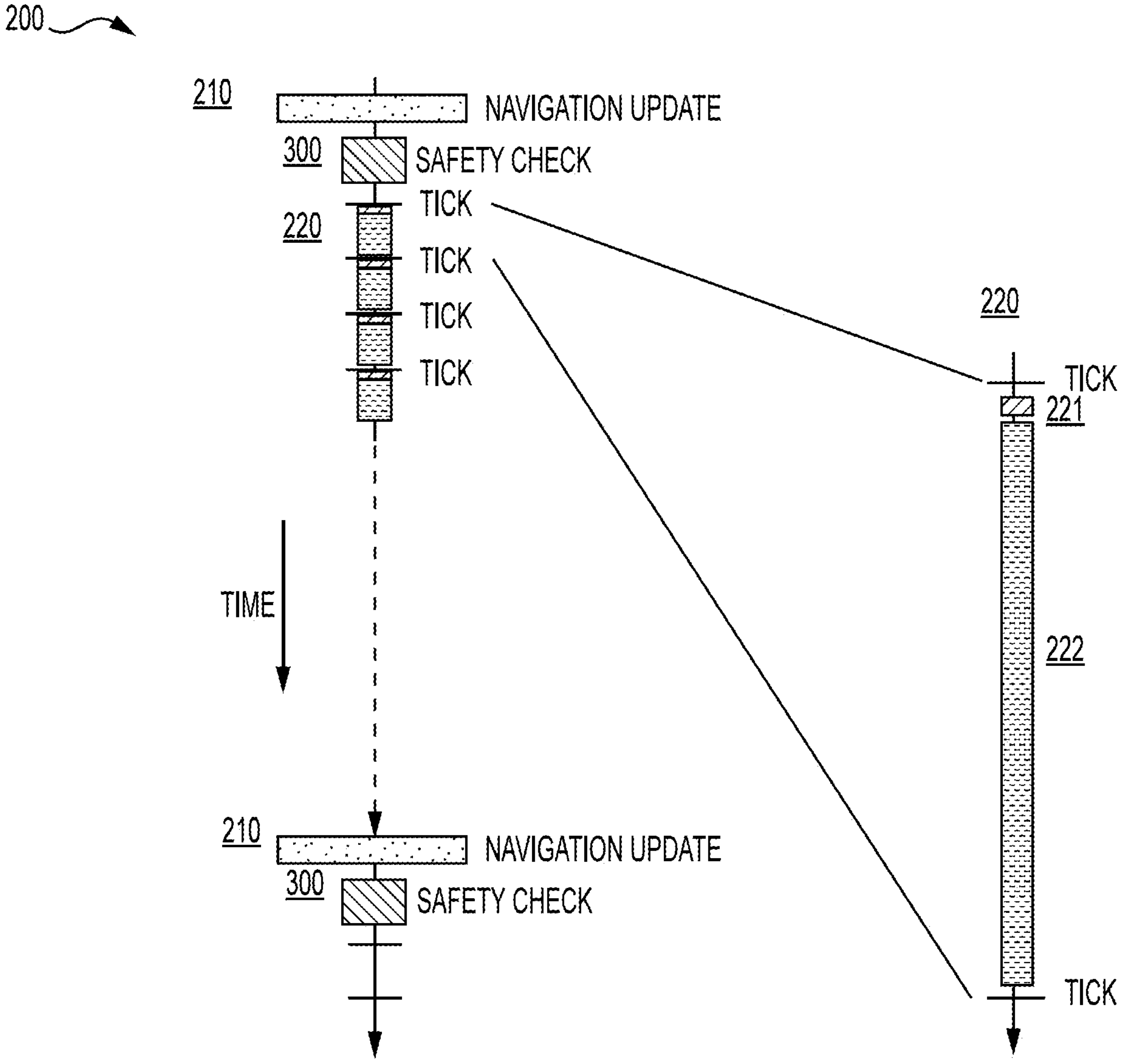
FIG. 2 is a schematic diagram showing steps of an autonomous neural network control method for spacecraft navigation having a safety check.

A method 200 is illustrated in FIG. 2 as a schematic diagram showing the steps of an exemplary concept of operations (ConOps) method for Optimal Low Thrust Artificial Intelligence Reoptimization (OLTAIR). The ConOps method for OLTAIR may be modified to suit particular mission constraints. Method 200 is an example of autonomous neural network control method 105 of FIG. 1B used for low-thrust maneuver correction. The ConOps method of OLTAIR comprises software, logically broken-up into two distinct sections: (1) Liboltair, which contains the platform-independent core autonomous trajectory correction logic; and (2) The cFS ecosystem, which contains all platform-specific functionality to use Liboltair in a flight-safe environment. Liboltair further includes a set of user-defined platform-specific interfaces, a generated 'almanac' containing a set of time dependent pre-trained neural network models, and the core logic to operate on the almanac and to utilize the interfaces as needed for autonomous trajectory corrections. Liboltair may operate through a single-entry point function known as the 'tick' function to avoid a control-loop specific design.

A navigation update 210 comprises a spacecraft computer receiving a navigation update and determines a current spacecraft state (e.g., state $\vec{x}(t)$), as described below in connection with FIG. 3. Navigation update 210 may be provided live by the Global Positioning System (GPS), the optical navigation system, or the Cislunar Autonomous Positioning System (CAPS). Alternatively, navigation update 210 may be a logical calculation based on an earlier live navigation update, or navigation update 210 may be acquired by instruments onboard the spacecraft.

Following navigation update 210, an exemplary neural network safety check method 300 may be performed. For example, an onboard computer may perform the neural network safety check method 300 to evaluate one or more ticks 220, prior to the spacecraft executing any tick function, as further described below in connection with FIG. 3. For example, method 300 may propagate NN model outputs immediately after they are generated and evaluate whether an expected final state is within a predetermined tolerance. If an evaluation by the neural network safety check method 300 passes, then method 200 executes the one or more ticks 220.

Each tick 220 includes two separate maneuver types: a computer maneuver design 221 and a spacecraft maneuver 222. In embodiments, the computer maneuver design 221 performs the autonomous trajectory correction logic of Liboltair described above. The computer maneuver design 221 includes the following steps: 1) The computer checks the current state and estimates if a maneuver is needed in this step. If the maneuver is not needed in this step, the computer coasts to the next tick evaluation. If the maneuver is needed in this step, the computer performs the next computer maneuver step. 2) The computer identifies the relevant model weights to read from an almanac. The almanac is a collection structure of neural networks, which contains NN models and ancillary information. 3) The computer evaluates NN models to map a state estimate $\vec{x}(t_i)$ to a maneuver $\Delta\vec{v}(t_i)$. 4) The onboard propagator predicts a next state $\vec{x}(t_i+1)$, assuming the spacecraft executes the commanded maneuver perfectly. 5) The computer increments to the next tick 220. It takes less than a second for the computer to perform the individual steps of the computer maneuver design 221. Executing the spacecraft maneuver 222 may take minutes or longer. Because the computer maneuver design 221 is performed much more quickly than the spacecraft maneuver 222, the neural network safety check method 300 is able to execute a series of steps of the computer maneuver design 221 without performing the spacecraft maneuver 222 and evaluate the spacecraft commands and outcomes much faster than, and prior to, the real-time execution of the spacecraft maneuver 222. Following a successful evaluation by the NN safety check method 300, the spacecraft maneuver 222 may then be executed. Once the spacecraft executes a commanded thrust, it then coasts until the next tick 220. One or more ticks 220 may be performed until the spacecraft computer receives a next set of navigation updates 210. The spacecraft computer then repeats the NN safety check method 300 and one or more ticks 220 in another cycle.

A working example of a neural network model is the application of neural network control for electric propulsion (NNEP) in 3-Body orbits. The reliability of the NN model has been demonstrated at the following three levels: 1) the NN is automatically tested with every code version submitted to a version control system, which verifies that the NN output vector matches expected values when provided with a given set of weight parameters and a given input vector; and, 2) the NN is tested via Monte Carlo trials on ground computers, which includes randomly sampling an expected distribution of spacecraft states for which the NN should be valid, evaluating the NN on each of those states, and propagating the output to the target epoch. Monte Carlo ground testing verifies that the NN training did not overfit the training data and that the NN is accurate for flight operations. If the NN is found to be inaccurate, a smaller NN model may be used, which provides more robust but less precise outputs, and/or more training samples may be generated for the NN model. The testing provides information as to how a spacecraft responds to stressing situations prior to uploading the NN to the spacecraft. (3) The NNEP technology has reliability built into its architecture. For example, the flight software (FSW) propagates the NN outputs immediately after they are generated, evaluating whether the expected final state is within tolerance and whether path constraints (e.g., eclipses or close approaches to other bodies) are met.

Historically, achieving a 2-day navigation and control update loop with human-in-the-loop control has required 24-hr coverage from operations teams and is only practical for short periods of critical operations. In contrast, once a state estimate is available for NNEP, thruster commands may be provided immediately, drastically reducing the time of the navigation and control update loop, while also automating the process. When the thruster is throttled smoothly, the NN model output is virtually indistinguishable from a perfect, ground-generated solution.

FIG. 3 shows an exemplary neural network safety check method 300. The NN safety check method 300 autonomously performs an onboard simulation prior to executing any tick function. In embodiments, the NN model is used to simulate one or more ticks 220 until a predetermined time in the future. For example, the NN model computes a spacecraft maneuver (e.g., a coast, a thrust, a reaction wheel moment, etc.) in a step 320, then the onboard propagator simulates the motion resulting from the spacecraft maneuver in a step 330 without actually executing the maneuver. The NN model outputs are evaluated in a step 340 to determine if any of the propagated spacecraft states have deviated more than expected from a reference path (e.g., if any model constraints have been broken). The result of the safety check method 300 is pass or fail. If the safety check result is "pass" (i.e., no constraints are violated from the onboard simulation's prediction over the next predetermined timeframe), no approval from ground control is needed to proceed, and the spacecraft executes the maneuver one tick at a time. If the safety check result is "fail", corrective action is taken before proceeding, as described below.

Prior to performing the NN safety check method 300, a navigation update 210 is performed as described above in connection with FIG. 2. For example, a computer onboard the spacecraft receives updated navigation information and determines the current spacecraft state. The spacecraft state $\vec{x}(t)$ is for example a position and a direction (i.e., a vector) at the current time. The navigation update may include the spacecraft state $\vec{x}(t)$ as well as the current time t. In an example of step 210, live navigation updates may be provided by the Global Positioning System (GPS), the optical navigation system, or the Cislunar Autonomous Positioning System (CAPS). In another example of step 210, the navigation updates are a logical calculation based on an earlier live navigation update. Alternatively, the navigation updates may also be acquired by instruments onboard the spacecraft.

In step 320, the onboard computer calculates neural network (NN) outputs from the NN model. The NN outputs may be from any NN model, including but not limited to a NN electric propulsion (NNEP) algorithm applied for use with various spacecraft maneuvers such as those described above. In one particular example of step 320 regarding maneuver corrections for minimum-fuel transfers, the onboard neural network control for electric propulsion (NNEP) model is used to calculate and return the minimum-energy solution: minimizing $\int u(t)^2 dt$, where u(t) is the control magnitude at time t. While that provides accurate solutions, real spacecraft operations are typically more concerned with the minimum-fuel solution: minimizing $\int u(t)^2 dt$. The minimum-fuel solution has discontinuities at thrust on/off switching points making it a much more difficult and sensitive optimization problem. The minimum-fuel solution is also discontinuous in the relationship between state $\vec{x}(t)$ and costate $\vec{\lambda}(t)$ at time t, making it hard for a NN model to accurately learn the control response to a given state error. To get around the discontinuity problem, NN models are trained on the smoothed-minimum-fuel problem. For the smoothed-minimum-fuel problem, the objective is modified to: $\int (u+\in[u\log u+(1-u)\log(1-u)])dt$, where u=u(t) and $\in$ is a smoothing term. When $\in$ is small ($\sim 10^{-4}$), the optimal solution is nearly indistinguishable from the true minimum-fuel solution. When $\in$ is large (~0.1), the optimal solution resembles the minimum-energy solution. In embodiments, using $\in=10^{-2}$ works well by providing nearly-fuel-optimal solutions while also being smooth enough for NN models to accurately capture the relationship between state $\vec{x}(t)$ and costate $\vec{\Delta}(t)$. For the onboard NNEP model, one or a plurality of NN inputs, including the current time (t*), the perturbed position or $\delta\vec{r}$, and the perturbed velocity $\delta\vec{v}$, are calculated and propagated to target epochs. The fixed-time two-point boundary value problem (TPBVP) is solved for the transfer back to the nominal at time $t^*+\Delta t$, where the time interval $\Delta t$ is fixed and may be on the order of a few days or tens of days.

In step 330, the NN model output is propagated to the next target epoch (i.e., the next "tick") to determine a next navigation state of the spacecraft. In an example of step 330 for maneuver corrections for minimum-fuel transfers, the onboard computer propagates the spacecraft state with NN model output control to the next tick epoch.

In step 340, the onboard computer evaluates whether the calculated NN model output and the propagated spacecraft state are within predetermined bounds. In an example of step 340 for maneuver corrections for minimum-fuel transfers, if the calculated control and propagated state pass the evaluation, (e.g., the onboard computer determines that the calculated control and propagated state are within predetermined bounds), then the safety check result is "pass" and method 300 increments to the next tick in step 390. The spacecraft may then begin executing one or more ticks in step 220 until the next navigation update 210, as described above in connection with FIG. 2.

If in step 340 the result of the safety check is "fail", (e.g., the onboard computer determines that the calculated control and propagated state are not within predetermined bounds), then a corrective action is taken in a step 350 without the spacecraft performing the next tick function. Only if the safety check fails (e.g., one or more constraints are violated) does the spacecraft need input from the ground. For example, a hardware failure may put the spacecraft on a substantially different trajectory than the planned trajectory.

Example parameters that are checked during the safety check method 300 include but are not limited to: a close approach distance to a planet or another spacecraft; a spacecraft attitude (e.g., if a thrust maneuver would cause the spacecraft to slew to an attitude that would expose a sensitive instrument to direct sunlight); a position or velocity deviation that puts the spacecraft outside of an acceptable trajectory range; an amount of propellant used (e.g., to ensure the NN output control will not consume more than the expected range of propellant).

In step 350, corrective action is taken. For example, the corrective action may be to revert to legacy human-in-the-loop operations in a step 380. The corrective action may be mission dependent. For example, a safety maneuver may be executed (e.g., raise altitude), then the spacecraft waits for ground control input; or, the spacecraft may coast while waiting for ground control input. In some embodiments, the onboard computer autonomously reverts to a different NN model in a step 360 before reverting to human-in-the-loop operations in step 380.

In optional step 360, a different NN model is used. In an example of step 360, a smaller NN model is used to provide a more robust but less accurate NN model output. The onboard computer then repeats steps 320, 330, and 340 of NN safety check method 300 based on the smaller NN model. For example, the original NN model may be nominally trained to have dispersion states on the order of 1000-km, while a smaller NN model may be trained with larger dispersion states (e.g., on the order of 10,000-km). The smaller NN model is less accurate but more robust than the original NN model. For certain missions and for certain periods within a mission, the smaller NN model may be used while ground control is notified and human-in-the-loop operations are considered.

In step 380, legacy human-in-the-loop operations may be used. In an example of step 380, a human operator(s) would uplink control commands as a function of time for returning the spacecraft to the reference path within the time interval Δt.

Prior to use of a NN model onboard a spacecraft, extensive Monte Carlo random sampling may be performed on the ground. Expected error sources such as orbit determination inaccuracies, thruster mis-calibration or off-pointing, and temporary forced-coasting periods are randomly sampled in end-to-end simulations of the trajectory or orbit where the NN model will be used.

FIG. 4 shows an exemplary software architecture within which a safety check may be performed for verifying output from one or more models via the spacecraft computer onboard the spacecraft. An autonomous control executive (ACE) 410 is configured for autonomously scheduling activities associated with autonomous control of spacecraft, including but not limited to autonomous neural network control for spacecraft navigation. For example, ACE 410 provides dedicated scheduling of operations for controlling the timing of various functions, including but not limited to functions performed by a navigation app 420, a maneuver design app 430, and a safety check app 440. ACE 410 may be configured to handle all scheduling activities including incrementing of ticks. For example, ACE 410 may schedule ticks 220 of FIG. 2 instead of via the OLTAIR software of the example described above. However, other schedule processes that do not rely upon a tick cadence may be employed via ACE 410 without departing from the scope hereof. The frequency of navigation updates, maneuver designs, execution of designed maneuvers, and safety checks may be tailored via ACE 410 based upon specific mission and vehicle needs.

Navigation app 220 comprises a software application stored in non-volatile memory of the spacecraft computer configured for providing navigation determinations, including but not limited to navigation update 210 of FIG. 2. ACE 410 provides one or more commands to navigation app 220 (e.g., a command to provide a navigation update). Navigation app 420 receives the one or more commands, performs the requested calculations, and returns an output (e.g., navigation update 210) back to ACE 410. In embodiments, navigation app 220 uses one or more NN models based on training data sets to determine the navigation update.

Similarly, maneuver design app 430 comprises a software application stored in non-volatile memory of the spacecraft computer configured for providing spacecraft maneuver commands, including but not limited to computer maneuver design 221. ACE 410 provides one or more commands to maneuver design app 430 (e.g., a command to determine steps for a certain spacecraft maneuver). Maneuver design app 430 receives the one or more commands, performs the requested calculations to determine a maneuver design output state, and outputs the maneuver design output state (e.g., computer maneuver design 221) back to ACE 410. In embodiments, maneuver design app 430 uses one or more NN models based on training data sets to determine the maneuver design output state.

Lastly, safety check app 440 comprises a software application stored in non-volatile memory of the spacecraft computer configured for performing a safety check of the maneuver design output from the maneuver design app 430. The safety check may include but is not limited to safety check 300 of FIG. 3. ACE 410 provides one or more commands to safety check app 440 (e.g., a command to verify the steps of a spacecraft maneuver design). Safety check app 440 receives the one or more commands, performs the requested functions, and returns a pass/fail output to ACE 410 as to whether the maneuver design is outside predetermined bounds (e.g., to determine if any of the propagated spacecraft states have deviated more than expected from a reference path).

Due to the dedicated scheduling of operations performed by ACE 410, one or more safety checks may be evaluated at any time depending on mission needs. In other words, the order and timing of the steps shown in FIG. 2 may be varied; likewise, the sequence of steps shown in FIG. 3 and described above may also be varied. For example, using ACE 410, safety check 300 may be evaluated after any type of onboard maneuver process, including NN control and other (i.e., non-NN) types of control. Another advantage of using ACE 410 is that additional capabilities may be easily added in the future.

FIG. 5 shows an exemplary ConOps method 500 for autonomous spacecraft navigation. The ConOps method 500 may be configured generally for executing any type of vehicle maneuver process onboard the vehicle, including but not limited to the OLTAIR ConOps method described above in connection with FIG. 2. ConOps method 500 may be used in conjunction with ACE 410 of FIG. 4 or on a tick cadence similar to FIG. 2 or using another scheduling scheme.

For example, ACE 410 may provide a command to navigation app 420 to perform a navigation update. In embodiments, ACE 410 may command navigation app 420 to receive inputs continuously or on a repeating schedule. For example, measurements or other navigation information may be received by navigation app 420 when it becomes available or shortly thereafter. Alternatively, navigation app 420 is configured to listen for inputs and executes the navigation update immediately upon receiving an input.

Navigation app 420 then outputs the navigation update (e.g., a vehicle state estimate) that is received by maneuver design app 430. In embodiments, the navigation app 420 executes a NN model for providing autonomous neural network control for spacecraft navigation. Maneuver design app 430 then determines a maneuver design output state for the vehicle (e.g., a set of commands to the spacecraft propulsion and guidance systems). The maneuver design output state is output from maneuver design app 430 and received by safety check app 440, which then performs a safety check (e.g., as described above in connection with FIG. 3).

If the result of the safety check is "fail", (e.g., the onboard computer determines that the calculated control and propagated state are not within predetermined bounds), then a corrective action is taken in a step 350 without the spacecraft performing the commanded steps of the maneuver design app 430. The corrective action may include reverting to human-in-the-loop operations 380, as described above in connection with FIG. 3; or the corrective action man include reverting to a different maneuver design 560 (e.g., via maneuver design app 430). The different maneuver design may comprise a simpler model being more robust and less accurate than an original maneuver design. For example, the different maneuver design 560 may include a different NN model as described above in step 360; however, any other type of maneuver design may be determined for taking a corrective action, including but not limited to the use of a non-linear programming solver or an optimization software such as the Sparse Nonlinear OPTimizer (SNOPT) software package.

If the result outputted from safety check app 440 is "pass" (i.e., no constraints are violated from the onboard simulation's prediction over the next predetermined timeframe), no approval from ground control is needed to proceed, and the vehicle executes the maneuver in step 550.

In operation, ConOps method 500 may be used for autonomous spacecraft navigation control during a long interplanetary trajectory where electric propulsion is active for months on end. In another example, ConOps method 500 may be used for autonomous spacecraft navigation control during a lunar landing where the entire process executes on a much shorter time scale (e.g., minutes to days).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A safety check method for checking a neural network output state onboard a spacecraft, the method comprising:

providing a neural network model to a disk storage of a spacecraft computer, wherein the spacecraft computer is configured to execute the neural network model onboard the spacecraft for navigating the spacecraft;

calculating, via the neural network model, a neural network output based on a current navigation state of the spacecraft, wherein the neural network output comprises a navigation control for the spacecraft;

propagating the current navigation state with the neural network output to a next target epoch to determine a next navigation state of the spacecraft;

evaluating whether the neural network output and the next navigation state are within predetermined bounds based on a training tube comprising position and velocity deviations around a nominal path;

checking that parameters are within predetermined ranges, the parameters comprising one or more of an approach distance, a spacecraft attitude, a velocity deviation, and an amount of propellant used;

incrementing to a next scheduled function when the neural network output and the next navigation state are within the predetermined bounds and the parameters are within the predetermined ranges; and taking a corrective action when the neural network output and the next navigation state are determined to be outside the predetermined bounds or one of the parameters is outside a respective one of the predetermined ranges, wherein taking the corrective action comprises reverting to a smaller neural network model being more robust and less accurate than an original neural network model, then repeating the steps of calculating, propagating, and evaluating with the smaller neural network model until the neural network output and the next navigation state are determined to be within the predetermined bounds and the parameters are within the predetermined ranges.

2. The method of claim 1, wherein the navigation control comprises instructions for the spacecraft to coast when no spacecraft maneuver requiring a change in velocity is needed.

3. The method of claim 1, when the neural network output and the next navigation state are determined to be outside the predetermined bounds or one of the parameters is outside a respective one of the predetermined ranges, the method does not increment to a next scheduled function.

4. The method of claim 1, comprising commanding the spacecraft to coast while taking the corrective action.

5. The method of claim 1, wherein taking the corrective action comprises performing a human-in-the-loop operation in which one or more commands are sent to the spacecraft from a ground control station.

6. The method of claim 5, comprising commanding the spacecraft to coast while waiting for the one or more commands from the ground control station.

7. A method for navigating a spacecraft with safety checking of a maneuver design output state, the method comprising:

storing software applications comprising an autonomous control executive, a navigation app, a maneuver design app, and a safety check app to a disk storage of a spacecraft computer, wherein the autonomous control executive is configured to execute the navigation app, the maneuver design app, and the safety check app onboard the spacecraft;

scheduling operations for controlling a timing of functions of a space mission via the autonomous control executive, comprising scheduling the navigation app to provide a plurality of navigation state estimates, scheduling the maneuver design app to provide one or more spacecraft maneuver designs, and scheduling the safety check app to check the one or more spacecraft maneuver designs;

receiving navigation state inputs via the navigation app and outputting an updated navigation state estimate based upon the navigation state inputs;

receiving, via the maneuver design app, the updated navigation state estimate and outputting a maneuver design output state via an original neural network model;

performing a safety check via the safety check app, wherein the safety check app receives the maneuver design output state and determines whether the maneuver design output state is within predetermined bounds;

when the maneuver design output state is within the predetermined bounds, commanding the spacecraft to perform a spacecraft maneuver;

when the maneuver design output state is determined to be outside the predetermined bounds, commanding the spacecraft to perform a safety maneuver and reverting to a smaller neural network model being more robust and less accurate than the original neural network model, wherein the outputting of the maneuver design output state and the performing of the safety check are repeated with the smaller neural network model until the maneuver design output state is determined to be within the predetermined bounds; and commanding the spacecraft to coast until a next function of the space mission according to scheduling the operations via the autonomous control executive.

8. The method of claim 7, wherein the maneuver design output state comprises a plurality of neural network outputs to be executed as a series of steps prior to a next navigation state.

9. The method of claim 7, wherein commanding the spacecraft to perform the safety maneuver comprises raising an altitude of the spacecraft.

10. The method of claim 7, comprising reverting to a simpler maneuver design being more robust and less accurate than an original maneuver design when the maneuver design output state is determined to be outside the predetermined bounds, then repeating the step of performing the safety check.

11. The method of claim 7, comprising sending an error message to a ground control station and waiting for a reply message from the ground control station when the maneuver design output state is determined to be outside the predetermined bounds.

12. A control architecture configured for performing a safety check of a maneuver design for navigation of a spacecraft, the control architecture comprising:

an autonomous control executive, a navigation app, a maneuver design app, and a safety check app each comprising a software application stored in a disk storage of a spacecraft computer, wherein the spacecraft computer is configured to execute the autonomous control executive, the navigation app, the maneuver design app, and the safety check app onboard the spacecraft;

wherein the autonomous control executive provides dedicated operation scheduling for the navigation app, the maneuver design app, and the safety check app for controlling a timing of functions at predetermined times for a duration of an entire space mission;

wherein the navigation app is configured to determine a navigation update based on a navigation state estimate of the spacecraft at each of the predetermined times;

wherein the maneuver design app is configured to determine a maneuver design based on the navigation update at each of the predetermined times, the maneuver design being determined via an original neural network model;

wherein the safety check app is configured to perform a safety check that determines whether the maneuver design is within predetermined bounds at each of the predetermined times; and wherein when the maneuver design is determined to be within the predetermined bounds, a spacecraft maneuver is executed, and when the maneuver design is determined to be outside the predetermined bounds, the spacecraft coasts while a corrective action is taken by the autonomous control executive, wherein the corrective action comprises reverting to a smaller neural network model being more robust and less accurate than the original neural network model, re-determining the maneuver design via the smaller neural network model, and re-performing the safety check until the maneuver design is determined to be within the predetermined bounds.

13. The control architecture of claim 12, wherein the dedicated operation scheduling provided by the autonomous control executive comprises determining a frequency of the navigation update, determining a frequency of the maneuver design, and determining a frequency of the safety check.

14. The control architecture of claim 12, wherein the navigation app comprises a neural network model, and the navigation app is configured to determine a neural network model output based on a current navigation state of the spacecraft.

15. The method of claim 1, wherein the neural network model is configured for performing a minimum-fuel transfer, a GEO station keeping orbit, an Earth-Moon halo orbit station keeping, a trajectory correction maneuver for a chemical propulsion interplanetary mission, a many-revolution spiral transfer, or a LEO station keeping orbit.

16. The method of claim 1, wherein the neural network model is configured to provide electric propulsion control in 3-Body orbits and the neural network model is trained on a smoothed-minimum-fuel problem.

17. The method of claim 1, wherein a plurality of spacecraft maneuvers are scheduled to be executed as a series of steps within the next target epoch such that the neural network output comprises a plurality of navigation controls to be executed in series prior to evaluating whether the next navigation state is within the predetermined bounds.

18. The method of claim 1, wherein the original neural network model is trained with the training tube having dispersion states on the order of 1000-km, and the smaller neural network model is trained with dispersion states on the order of 10,000-km.

19. The method of claim 1, wherein checkpoints are employed prior to parts of a trajectory such that the neural network model maintains the spacecraft within the training tube.

* * * * *